United States Patent [19]

Roales

[11] Patent Number: 4,608,284

[45] Date of Patent: Aug. 26, 1986

[54] HEAT SHRINKABLE LABEL AND RELATED CONTAINER

[75] Inventor: John Roales, Hempstead, N.Y.

[73] Assignee: Cellu-Craft Inc., New York, N.Y.

[21] Appl. No.: 693,191

[22] Filed: Jan. 22, 1985

[51] Int. Cl.⁴ .................... B65D 1/12; B32B 27/08
[52] U.S. Cl. .................................. 428/35; 428/346;
 428/351; 428/516; 428/913; 215/12 R
[58] Field of Search .............. 215/12 R, DIG. 6;
 428/35, 515, 910, 913, 461, 351, 516, 346

[56] References Cited

U.S. PATENT DOCUMENTS

| | | | |
|---|---|---|---|
| 3,912,100 | 10/1975 | Graham et al. | 215/12 R |
| 3,955,020 | 5/1976 | Cavanagh et al. | 428/35 |
| 3,979,000 | 9/1976 | Karabedian | 215/12 R |
| 4,190,168 | 2/1980 | Jacques | 428/35 |
| 4,444,839 | 2/1984 | Dudzik | 428/346 |
| 4,463,861 | 8/1984 | Tsubone et al. | 215/12 R |

FOREIGN PATENT DOCUMENTS 2048720 12/1980 United Kingdom .

Primary Examiner—John E. Kittle
Assistant Examiner—James J. Seidleck
Attorney, Agent, or Firm—Roberts, Spiecens & Cohen

[57] ABSTRACT

A label is provided consisting of a lamination of two layers. One of these layers is a printable layer capable of being heat shrunk onto a can the upper and bottom parts of which are tapered inwardly. The preferred material for this layer is polystyrene. The other layer is polypropylene the function of which is to add strength to the first layer and to trap there against the printing ink which is printed onto the polystyrene layer. The polypropylene permits undistorted perception of the printed material. The two materials cooperate to permit printing and label application processes.

15 Claims, 4 Drawing Figures

HEAT SHRINKABLE LABEL AND RELATED CONTAINER

FIELD OF INVENTION

This invention related to heat shrinkable labels and to related containers employing such labels.

BACKGROUND

In the packaging of liquids, metal and plastic cans are employed which bear external printing. The printing identifies the source of the packaged substances and exhibits other information such as weight and analysis of the contents. This printing has heretofore been directly applied to the cans, which fact greatly limits the flexibility of the user's inventory. For example, if a packager or canner of soda orders a large number of pre-printed cans and desires to switch to a different liquid soda to be placed therein, the pre-printed cans become useless.

In any event, it is recognized that it would be a matter of great convenience, if it were to be possible for canners to be able to stock unprinted cans and to be able to apply labels thereto subsequently and selectively as it becomes determined specifically what materials are to be canned therein.

Many labels are available for the delayed labelling of metal and plastic cans. Paper labels have been known for years. However, direct printing has now established standards which canners are reluctant to give up. Direct printing is glossy, the colors and data exhibited are more easily perceived, the printing is generally more scuff resistant and so forth.

There are also specific problems which have been developed which derive from the specific shapes of cans which have been developed. That is, modern day cans taper inwardly at the upper and lower extremities thereof and a label must either avoid extending to these extremities or must conform closely to the shapes thereof.

Many plastic or copolymer labels have been developed for various purposes. These include the labels disclosed in U.S. Pat. Nos. 3,955,020; 3,979,000; 4,038,446; 4,120,225; 4,172,152; 4,253,892; 4,281,769; and Re. 30,805. In U.S. Pat. No. 3,955,020 J. Cavanagh discloses a glass container wrapped in a plastic laminate which is held to the glass by an adhesive. The laminate protects the user against the shattering of the glass. The laminate is not intended to cup around tapered portions of the associated bottle inasmuch as this is accomplished by spraying onto these tapered portions a plastic material which thereby conforms to the tapered shape. Alternatively, covering structures are described which have been preformed and are shrunk fit onto the associated bottle.

J. Karabedian discloses in U.S. Pat. No. 3,797,000 a glass container which is provided externally thereof with a heat shrunk cellular thermoplastic member circumferentially and snugly engaging the sidewall portion thereof. The thermoplastic member which is heat shrunk onto the glass container is a layer of polystyrene into which is incorporated a copolymer of ethylene and alkyl ester or the like. The intention is to provide improved gas retention characteristics. Over the first layer is provided a non-cellular polymeric material preponderantly of ethylene moieties having other substances incorporated into the same. The non-cellular layer is disposed between the container and the cellular layer.

In U.S. Pat. No. 4,038,446, R. Rhoads discloses a container provided with a heat shrunk cellular thermoplastic member engaging a sidewall portion of the container. The thermoplastic member is a laminate of a closed cellular polymeric layer in which the polymer is of predominantly olefin moieties with a non-cellular polymeric layer thereon of predominantly olefin moieties.

E. Bailey discloses in U.S. Pat. No. 4,129,225 a glass bottle with a covering of an organic polymeric material such as foamed polystyrene or the like.

In U.S. Pat. No. 4,172,152, R. Carlisle discloses a container structure for carbonated beverages with a multiple wall structure having an inner wall and an outer wall. The inner wall is formed of a material through which a gas might be able to migrate. The outer wall is formed of a material which is impervious to the gas. The walls are formed of thin heat sealable sheet material to provide a flexible thermally insulated carbonated beverage container.

In U.S. Pat. No. 4,253,892, J. D'Angelo et al discloses a bag defined between layers of polypropylene microfoam material with protective outer kraft paper layers. The kraft paper is burned away during heat sealing of a polyethylene coating on the inner surfaces of the kraft paper.

R. Ignell discloses in U.S. Pat. No. 4,281,769 a container with dished end portions. A tubular member is included which is formed of a laminate including a layer of polypropylene, polyvinyl chloride and a polyester.

R. Rhoads discloses in U.S. Pat. No. Re. 30,805 a heat shrunk cellular thermoplastic member in which olefin moieties predominate.

None of the above-noted labels or other known labels would be useful for the labelling of cans as contemplated in accordance with the invention. The reasons for this unacceptability are of wide variety. Known labels would distort during the process of applying the same to cans of the afore-described shape such as by, for example, heat shrinking. The printing thereon would be abused by handling during label application. Such labels, moreover, would not be able to conform readily and intimately to the can shapes especially at the tapered extremities. Printing on the labels would be difficult due to stretching.

In fact, there are many more reasons why previously available labels would not be satisfactory for the uses contemplated in accordance with the invention and these reasons have led to the development of the novel label discussed hereinafter.

SUMMARY OF INVENTION

It is an object of the invention to provide an improved label capable of avoiding the various problems noted above as well as other problems which characterize the application of labels to containers such as metal and plastic cans.

It is another object of the invention to enable packagers to stock plain containers devoid of decoration or information and to apply labels to the containers immediately preceding the filling of the containers.

Yet another object of the invention is to provide an improved label of laminated materials, the characteristics of which are beneficially combined to result in clearly displayed printing which may be perceived without distortion while adequate physical strength is maintained in the label to withstand handling by mechanical equipment during the labelling process.

Still another object of the invention is to enable the canner, who is not a can manufacturer, to do his own labelling despite the use of can shapes which are not perfectly cylindrical.

It is yet a further object of the invention to provide an improved label of multi-ply construction to obtain characteristics which would not be provided by any single layer of the label.

Still another object is to provide an improved label adapted to heat shrinkage while resistant to breakage and stretching as might otherwise result during printing and application procedures.

Another object is to enable the use of water-based inks in the printing of labels to be used in a heat shrinking process.

Yet another object is to provide a moisture and scuff proof label having a layer which functions as a lubricated layer when passing through label applying equipment and after it is applied, thereby facilitating the handling of a multitude of such containers in gross.

In achieving the above and other objects of the invention there is contemplated the provision of a label or label material comprising a lamination of first and second layers. The lamination has a determinable longitudinal direction. The first layer is of a material which is both dimensionally stable at room temperature and shrinkable at temperatures substantially elevated above room temperature. The first layer is of a material which is resistant to elongation at least in the aforesaid longitudinal direction. The first layer is moreover an ink receptive layer having an ink receptive surface adjacent the second layer. In accordance with the invention, printing is comprised which is located on a surface between the layers. The material of the second layer is transparent and free of optical distortion whereby to permit clear perception of the aforesaid printing. The material of the second layer is moreover glossy and slippery to enable the second layer to function as a lubricated layer during application. Still further the material of the second layer is moisture resistant, resistant to dimensional change at elevated temperatures and scuff resistant.

In further accordance with the invention, a bending material is located between the aforesaid layers. Moreover the materials of the first and second layers are respectively by-axially oriented and non-oriented. In accordance with a preferred embodiment of the invention, the first layer is of biaxially oriented polystyrene having a thickness of 0.0005–0.003 inches. The second layer is preferably of non-oriented polypropylene having a thickness of 0.00025–0.002 inches. Preferably these layers have a thickness in the order of magnitude of about 0.001 inches.

According to a preferred embodiment of the invention, the first layer is opaque thereby concealing the surface of the container being covered. The bonding material mentioned above may be a urethane adhesive. The polypropylene which has been mentioned is preferably a non-oriented polypropylene such as cast or blown polypropylene which has not been substantially oriented such as by reheating, stretching and/or setting. The label material is preferably provided in the form of a roll including an inner core with a diameter in the order of magnitude of six inches. The material is adapted to form labels having dimensions, for example, in the order of magnitude of $4\frac{5}{8}$ inches in width and 8.6395 inches in length. Other dimensions are also possible.

According to another aspect of the invention there is provided a container comprising a cylindrical wall of metal or plastic, a top and a bottom on said wall to form therewith a storage space, said wall tapering inwardly adjacent the top and bottom to form top and bottom tapered portions. A heat shrinkable layer, of the form noted above, encircles the wall and conforms to the tapered portions. As aforesaid, the label comprises first and second layers in laminated relationship and of a form which has been referred to hereinabove.

The above and other objects, advantages and features of the invention will become more apparent from the detailed description which follows hereinbelow as illustrated in the accompanying drawing.

DETAILED DESCRIPTION

Figure 1:
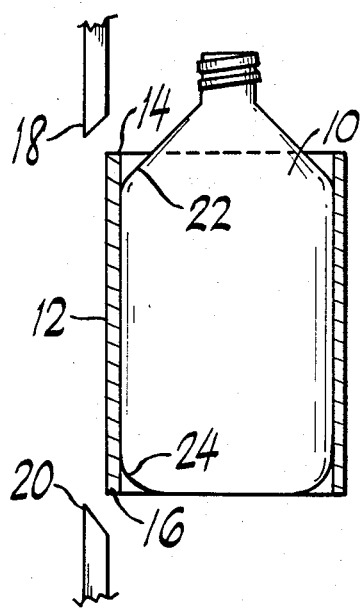
FIG. 1 is a diagrammatic illustration of the application of the label to a glass bottle container in accordance with the prior art.

FIG. 1 illustrates the application of heat shrinking labels onto a glass or plastic bottle in accordance with the description in U.S. Pat. No. 4,416,714 (W. Hoffmann). In this prior art patent is disclosed a machine and method for applying heat shrinkable labels having cylindrical body portions and end portions adjoining the body portion and sloping inwardly with respect thereto. The label is of a length such that its leading end overlaps the trailing end and a seam is formred at the overlap. The label is secured to the article by adhesive between the leading end and the container and by adhesive between the overlapping leading end and trailing end. The label is of a width such that it projects beyond the junctions of the end portions with the body portion resulting in free standing edges. In FIG. 1 the container is indicated at 10, with the label been indicated at 12, the free standing portions are indicated at 14 and 16.

In further accordance with the aforesaid prior art patent, tongues indicated at 18 and 20 are interposed between heat sources (not shown) and the label extremities. These tongues serve as heat shields to moderate the application of heat to the label. Each of the tongues is formed with a shape such that, as it is extended, it acts as a wedge to urge the associated free standing edge toward the article. Heat is applied so that the free standing edges are shrunk so as to conform to the tapered portions 22 and 24 of the container 10.

Figure 2:
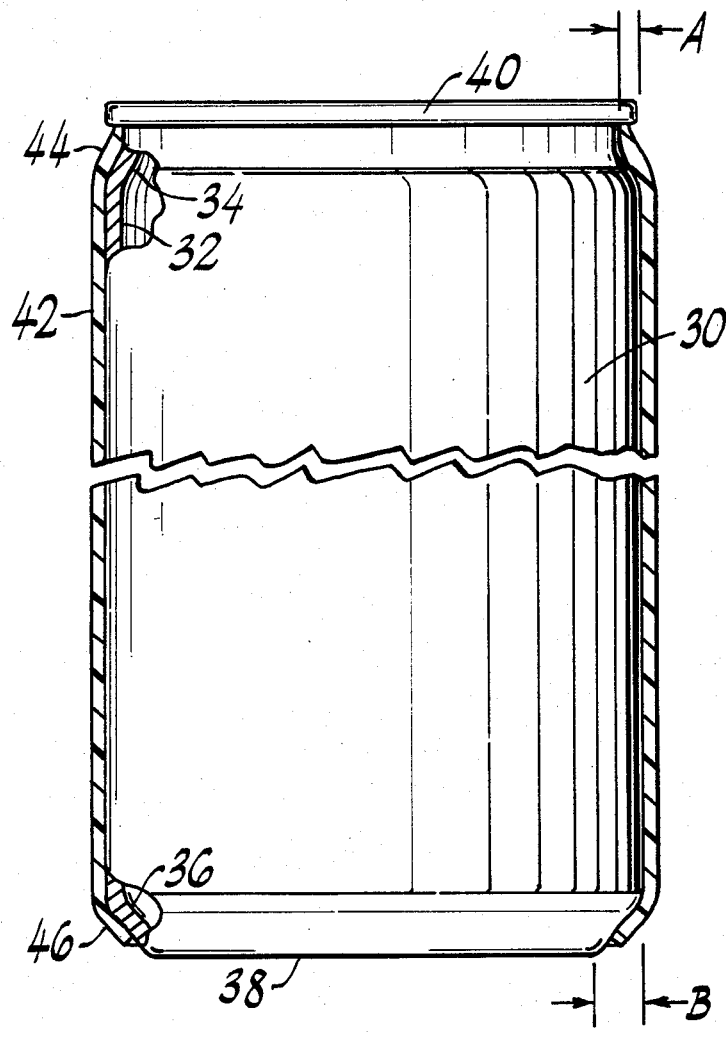
FIG. 2 is a partially sectional and broken away view of a metal can to which has been applied a label in accordance with the invention.

The invention is concerned with applying the aforedescribed techniques in the labelling of metallic or plastic cans and further to the object of avoiding the need for employing mechanical elements such as tongues 18 and 20 for the purpose of conforming the applied label to the tapered portions of the associated container. FIG. 2 illustrates a can 30 having a cylindrical sidewall 32 and upper tapered portion 34 and lower tapered portion 36. The can is moreover provided with a bottom 38 and a top 40. To this can is applied a label as indicated at 42. This label eventually acquires a tapered portion 44 associated with tapered portion 34 and a tapered portion 46 associated with tapered portion 36. At A in FIG. 2 is illustrated the magnitude of the deflection of the tapered portion 34. This would generally be found to lie in the dimensional range of 1/16-¼ of an inch. Dimension B in FIG. 2 illustrates the magnitude of deflection of the lower sloped portion 36. Dimension B lies in the range of from about ⅛-⅜ of an inch.

Figure 3:
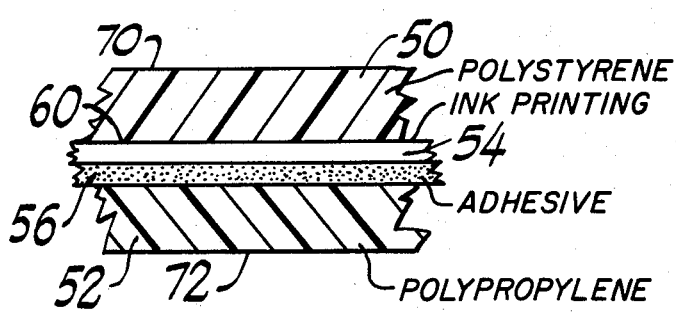
FIG. 3 is a fragmentary cross sectional view of a lamination employed as a label in accordance with the invention.

FIG. 3 illustrates a fragmentary portion of a lamination constituting a label according to the invention. This label is shown applied in FIG. 2. In FIG. 3 the lamination is shown as including a layer 50 associated with a second layer 52. Ink printing is indicated at 54 and a bonding agent or adhesive is indicated at 56. The layer 50 is applied adjacent the can or container and the layer 52 is outermost relative to the container. The purpose and function of these layers will be discussed in greater detail hereinbelow.

Figure 4:
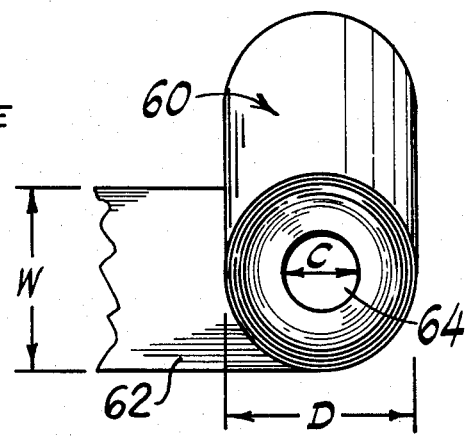
FIG. 4 is a diagrammatic view of the lamination in the form of a roll.

The preferred form in which the labels are presented to the canner or packager for use is illustrated in FIG. 4. Therein is illustrated a roll 60 having a leading edge portion 62 and provided with an inner core 64. The diameter of this inner core is indicated at C. It is preferably in the order of magnitude of 6 inches. The diameter of the roll in its original form is generally and preferably in the order of magnitude of 24 inches. The width W indicated with respect to leading edge portion 62, may comprise the width of one or more labels. Each label will have a width in the order of magnitude of 4 and ⅝ inches. Each label in a preferred application will have a length in the order of magnitude of 8.6395 inches.

Referring again in FIG. 3, layer 50 will preferably have a thickness in the order of magnitude of 0.0005 to 0.003 inches. Layer 52 will preferably have a thickness in the order of 0.00025 to 0.002 inches. Layer 50 more specifically has a preferred dimension of 0.001 inches plus or minus 15%. The combined materials preferably provide characteristics in cooperative manner to be enumerated hereinbelow.

Layer 50 is preferably of polystyrene. The purpose of this layer is to provide a heat shrinkable material which is stable at room temperature. Layer 50 is moreover to provide a printable surface as indicated at 60. The material must moreover be stiff enough and resistant to elongation such as to enable handling on a printing machine. Preferably the material of layer 50 may be opaque thereby to conceal the material of the container to which it is applied. It may also be clear for certain applications. Furthermore, the material is preferably adaptable to being metallized. Its thickness is a compromise between strength, stiffness and cost.

The lamination of layer 50 with layer 52 can be effected by means of extrusion lamination or co-extrusion. In the preferred form the layers are bonded together by a suitable bonding agent. One such suitable bonding agent is a urethane curing type adhesive. One specific such adhesive is MORTON THIOKOL LAMAL HSA. MORTON THIOKOL is located at 110 N. Wacker Drive, Chicago, Ill.

The ink indicated at 54 may be a water-based or solvent-based ink. The ink is trapped between the two layers and is protected thereby. One such ink is identified as Multi-Lam provided by Converters Ink Company of 1301 S. Park Avenue, Linden, N.J.

A polystyrene employed in accordance with the invention is one mil XD65019.01 (white) provided by Dow Chemical Corp. of Midland, Mich. This polystyrene is characterized by a very low level elongation and is in fact highly resistant to elongation. This characteristic is important in providing for the printing operation since any non-negligible amount of elongation could provide distortion in the printing. The sides indicated at 70 and 72 in FIG. 3 should be receptive to various adhesives as may be necessary to apply the label to the associated contianer and also to bond the overlaping ends of the label.

Layer 52 is formed of non-oriented polypropylene such as Extrel 11, provided by Exxon Chemical Americas of Park Terrace South, Houston, Tex. This includes cast and blown polypropylene. The function of layer 52 is to provide a clear transparent layer through which the print on layer 50 may be seen without distortion. The surface indicated at 72 in FIG. 3 is preferably glossy with a coefficient of friction adapted to make the same extremely slippery so that the surface acts as a lubricated surface.

This characteristic has two goals. One of these goals is to provide for "lubrication" of the label with respect to the equipment which applies the label to the associated can. The second goal is to provide that the cans have slippery surfaces to enable the cans to be processed after the cans have been formed and are herded together in mass production handling techniques. Thus the outer surface 72 must provide for sliding of the labels over the plastic or metal elements in the labelling machinery and must also provide for friction-free encounters between the cans themselves when they are grouped together and shuffled along in processing equipment.

In addition to the aforesaid characteristics, layer 52 must be of a material which is resistant to moisture and heat shrinkage and which is also scuff and puncture resistant. It must also be strong at least in tensile or longitudinal direction, to prevent undue elongation or breakage of the label as it is being employed in the labelling equipment.

The combination of materials specifically employed (namely polystyrene and polyproplylene) has been found peculiarly capable of resisting elongation, providing adequate tensile strength and providing resistance to spurious tear, while nevertheless providing a facility for directional tearing, which aids in cutting the labels. The resultant label is normally formable without requiring mechanical assistance. The temperature applied for shrinking will generally lie in the order of magnitude of 250°-300° F. This heat need only be applied for a period of 3 to 4 seconds to enable obtaining the desired result.

The polypropylene, employed in accordance with the invention, is preferably non-oriented polypropylene. No known substitute has been found for this material, while taking into account the economical aspects of providing labels in accordance with the invention. Labels of the invention provide a skin type wrap which is capable of being heat shrunk at the top and bottom into conformation with the sloped upper and bottom portions of metal and plastic cans or the like. Bottles may also be labeled with the lamination of the invention. The materials employed affect one another, since the polyestyrene if employed alone would distort and scuff, whereas the polypropylene would stretch too much to permit the use thereof. No known single material would be heat shrinkable and have the other characteristics essential to the invention.

The invention may be considered directed to a lamination suitable for use as a label material or may be considered in the form of a container complete with the heat shrunk label applied thereto.

The aforesaid XD65019.01 film is a rubber modified high impact styrene of the following properties:

| Property | Test Method | Typical Value[1] | |
|---|---|---|---|
| Ultimate Tensile Strength, psi | ASTM D-882 | MD | 4,800 |
| | | TD | 3,100 |
| Yield Tensile Strength, psi | ASTM D-882 | MD | 4,400 |
| | | TD | 3,100 |
| Ultimate Elongation, % | ASTM D-882 | MD | 25 |
| | | TD | 25 |
| 1% Secant Modulus, psi | ASTM D-882 | MD | 300,000 |
| | | TD | 250,000 |
| Opacity | TAPPI T-425 | 78 | |
| Yield (based on nominal 1.0 mil) in$^2$/# | | 25,000 | |

There will now be obvious to those skilled in the art, many modifications and variations of the construction set forth hereinabove. These modifications and variations will not depart from the scope of the invention if defined by the following claims.

What is claimed is:

1. A label material comprising a lamination of first and second layers, said lamination having a determinable longitudinal direction, said first layer being of a material which is both dimensionally stable at room temperature and shrinkable at temperatures substantially elevated above room temperature, said first layer being of a material which is resistant to elongation at least in said longitudinal direction, the material of said second layer being moisture resistant, resistant to dimensional change at elevated said first layer being of bi-axially oriented polystyrene having a thickness of 0.0005–0.003 inches. Said second layer being of non-oriented polypropylene having a thickness of 0.00025–0.002 inches.

2. A label material as claimed in claim 1 wherein said first layer has an ink reception surface adjacent the second layer.

3. A label material as claimed in claim 2 comprising ink printing on said surface between said layers.

4. A label material as claimed in claim 3 wherein the material of said second layer is transparent and free of optical distortion whereby to permit clear perception of said printing.

5. A label material as claimed in claim 4 wherein the material of said second layer is glossy and slippery to enable the second layer to function as a lubricated layer during application.

6. A label material as claimed in claim 5 comprising a bonding material between said layers.

7. A label material as claimed in claim 5 wherein said layers have a thickness in the order of magnitude of about 0.001 inches.

8. A label material as claimed in claim 1 wherein said first layer is opaque.

9. A label material as claimed in claim 6 wherein the bonding material is a urethane adhesive.

10. A label material as claimed in claim 1 wherein the polypropylene is cast polypropylene.

11. A label material as claimed in claim 9 wherein the material is in the form of a roll including an inner core with a diameter in the order of magnitude of six inches, the material being adapted to form labels having dimensions in the order of magnitude of 4⅜ inches in width and 8.6395 inches in length.

12. A container comprising a cylindrical wall of metal, a top and a bottom on said wall to form therewith a storage space, said wall tapering inwardly adjacent the top and bottom to form top and bottom tapered portions, and a heat shrinkable label encircling said wall and conforming to said tapered portions, said label comprising first and second layers in laminated relation, said first layer having a determinable longitudinal direction, said first layer being of a material which is both dimensionally stable at room temperature and shrinkable at temperatures substantially elevated above room temperature, said first layer being of material which is resistant to elongation at least in said longitudinal direction, the material of said second layer being moisture resistant, resistant to dimensional change at elevated temperatures and scuff resistant, said first layer being of bi-axially oriented polystyrene having a thickness of 0.0005–0.003 inches, said second layer being of non-oriented polypropylene having a thickness of 0.00025–0.002 inches.

13. A container as claimed in claim 12 wherein said first layer has an ink reception surface adjacent the second layer.

14. A container as claimed in claim 13 comprising ink printing on said surface between said layers.

15. A container as claimed in claim 14 wherein the material of said second layer is transparent and free of optical distortion whereby to permit clear perception of said printing.

* * * * *